(12) United States Patent
Hsu et al.

(10) Patent No.: US 11,650,705 B2
(45) Date of Patent: May 16, 2023

(54) TOUCH PANEL, ELECTRONIC DEVICE AND MANUFACTURE METHOD THEREOF

(71) Applicant: TPK Advanced Solutions Inc., Fujian (CN)

(72) Inventors: Wei You Hsu, New Taipei (TW);
Wei-Chen Huang, New Taipei (TW);
Liang-Yi Chang, Taoyuan County (TW); Han-Wei Chen, Taipei (TW);
Ho-Chien Wu, New Taipei (TW)

(73) Assignee: TPK Advanced Solutions Inc., Fujian (CN)

( * ) Notice: Subject to any disclaimer, the term of this patent is extended or adjusted under 35 U.S.C. 154(b) by 54 days.

(21) Appl. No.: 17/113,598

(22) Filed: Dec. 7, 2020

(65) Prior Publication Data
US 2022/0179519 A1   Jun. 9, 2022

(51) Int. Cl.
*G06F 3/044*   (2006.01)

(52) U.S. Cl.
CPC .. *G06F 3/0446* (2019.05); *G06F 2203/04103* (2013.01)

(58) Field of Classification Search
CPC ........ G06F 3/0446; G06F 3/041; G06F 3/044; G06F 2203/04103; G02F 1/13338
See application file for complete search history.

(56) References Cited

U.S. PATENT DOCUMENTS

| | | | | |
|---|---|---|---|---|
| 3,839,139 A | * | 10/1974 | Ito | A01G 13/0268 428/206 |
| 7,268,770 B1 | * | 9/2007 | Takahata | G06F 3/041 345/173 |
| 10,466,523 B2 | * | 11/2019 | Chen | G02F 1/133502 |
| 10,697,919 B2 | * | 6/2020 | Tsai | G01N 27/128 |
| 11,353,996 B2 | * | 6/2022 | Yang | G06F 3/0443 |
| 2005/0156906 A1 | * | 7/2005 | Chiu | G06F 3/0445 345/173 |
| 2005/0199481 A1 | * | 9/2005 | Mai | G06F 3/045 200/512 |
| 2011/0279406 A1 | * | 11/2011 | Kawaguchi | G06F 3/0443 174/126.1 |
| 2012/0169647 A1 | * | 7/2012 | Kuo | G06F 3/0446 345/174 |

(Continued)

FOREIGN PATENT DOCUMENTS

| | | |
|---|---|---|
| TW | 201447668 A | 12/2014 |
| TW | 201516801 A | 5/2015 |
| TW | 201516802 A | 5/2015 |

*Primary Examiner* — Amy Onyekaba
(74) *Attorney, Agent, or Firm* — Cooper Legal Group, LLC

(57) ABSTRACT

A touch panel is provided in the present disclosure, including: a substrate, a conductive trace structure, and a light-shielding structure. The substrate includes a visible area and a peripheral area, and the visible area is surrounded by the peripheral area. A conductive trace structure is disposed on the visible area. The light-shielding structure includes a first material layer and a second material layer, in which the optical density of the light-shielding structure is lower than 4, the first material layer is disposed on the peripheral area, and the second material layer is disposed on the first material layer. A method of manufacturing a touch panel is provided in some embodiments of the present disclosure for the effects of saving cost and improving wire drift.

20 Claims, 14 Drawing Sheets

(56) References Cited

U.S. PATENT DOCUMENTS

| | | | |
|---|---|---|---|
| 2012/0292170 A1* | 11/2012 | Yin | G06F 3/0446 200/512 |
| 2013/0169597 A1* | 7/2013 | Yin | G06F 3/0446 345/175 |
| 2013/0255998 A1* | 10/2013 | Iwami | G06F 3/0446 29/850 |
| 2014/0028928 A1* | 1/2014 | Yu | G06F 3/04164 349/12 |
| 2014/0054581 A1* | 2/2014 | Song | H01L 27/124 257/43 |
| 2014/0063373 A1* | 3/2014 | Wu | G02F 1/13338 349/12 |
| 2014/0071064 A1* | 3/2014 | Cho | G06F 3/0443 345/173 |
| 2014/0160374 A1* | 6/2014 | Wang | G06F 3/0446 427/79 |
| 2014/0176823 A1* | 6/2014 | Jeon | G06F 3/041 349/12 |
| 2014/0204290 A1* | 7/2014 | Chen | G06F 3/0443 349/12 |
| 2014/0209913 A1* | 7/2014 | Song | H01L 29/78633 257/72 |
| 2014/0239504 A1* | 8/2014 | Yau | H05K 3/1258 257/773 |
| 2014/0242297 A1* | 8/2014 | Yau | H05K 3/467 427/108 |
| 2014/0362308 A1* | 12/2014 | Chen | G06F 3/041 428/408 |
| 2014/0368757 A1* | 12/2014 | Chen | G06F 3/0443 349/12 |
| 2015/0042903 A1* | 2/2015 | Misaki | G06F 3/04164 349/12 |
| 2015/0053639 A1* | 2/2015 | Lin | G06F 3/041 216/19 |
| 2015/0064432 A1* | 3/2015 | Matsuyuki | C03C 17/3417 156/60 |
| 2015/0090395 A1* | 4/2015 | Lin | H03K 17/9618 156/239 |
| 2015/0114815 A1* | 4/2015 | Chang | H05K 3/46 216/13 |
| 2015/0116245 A1* | 4/2015 | Tseng | G06F 3/047 29/829 |
| 2015/0153881 A1* | 6/2015 | Misaki | G06F 3/0412 345/174 |
| 2015/0205406 A1* | 7/2015 | Zhou | G06F 3/0445 345/174 |
| 2016/0161847 A1* | 6/2016 | Araki | G03F 7/0035 430/7 |
| 2016/0170260 A1* | 6/2016 | Wachi | G02B 5/201 359/741 |
| 2016/0252785 A1* | 9/2016 | Kimura | G02F 1/133512 349/12 |
| 2016/0274689 A1* | 9/2016 | Lin | G06F 3/041 |
| 2016/0274707 A1* | 9/2016 | Xie | G06F 3/04164 |
| 2016/0282995 A1* | 9/2016 | Lee | G06F 3/04184 |
| 2016/0364032 A1* | 12/2016 | Shi | G06F 3/041 |
| 2017/0010710 A1* | 1/2017 | Kim | G06F 3/0443 |
| 2017/0123565 A1* | 5/2017 | Li | G06F 11/2221 |
| 2017/0131814 A1* | 5/2017 | Aridomi | G06F 3/0412 |
| 2017/0253719 A1* | 9/2017 | Morozumi | G03F 7/105 |
| 2017/0277314 A1* | 9/2017 | Chen | G06F 3/0416 |
| 2017/0285820 A1* | 10/2017 | Li | G06F 3/0446 |
| 2017/0308202 A1* | 10/2017 | Fang | G02F 1/0316 |
| 2018/0094131 A1* | 4/2018 | Tanaka | C08L 33/02 |
| 2018/0143707 A1* | 5/2018 | Shi | G06F 3/0412 |
| 2018/0201808 A1* | 7/2018 | Sugawara | B32B 27/30 |
| 2018/0203531 A1* | 7/2018 | Tsai | G06F 3/04164 |
| 2018/0203562 A1* | 7/2018 | An | G06F 1/3287 |
| 2018/0264778 A1* | 9/2018 | Ishikawa | B32B 27/16 |
| 2019/0064968 A1* | 2/2019 | Liu | G06F 3/04164 |
| 2019/0155424 A1* | 5/2019 | Nukui | G06F 3/047 |
| 2019/0258107 A1* | 8/2019 | Fujii | G02F 1/133308 |
| 2020/0033975 A1* | 1/2020 | Zhong | G06F 3/0412 |
| 2020/0081563 A1* | 3/2020 | Wang | G06F 3/04164 |
| 2020/0096812 A1* | 3/2020 | Hinata | G02F 1/133528 |
| 2020/0097113 A1* | 3/2020 | Fang | G06F 3/0412 |
| 2020/0209752 A1* | 7/2020 | Tsai | G03F 7/38 |
| 2020/0272260 A1* | 8/2020 | Zhang | G06F 3/041 |
| 2020/0272263 A1* | 8/2020 | Hsiao | G06F 3/047 |
| 2020/0326793 A1* | 10/2020 | Cheng | G06F 3/0412 |
| 2020/0371640 A1* | 11/2020 | Tsai | C23F 1/18 |
| 2021/0249448 A1* | 8/2021 | Yokotani | G02F 1/136236 |
| 2022/0050555 A1* | 2/2022 | Maruyama | G06F 3/04164 |
| 2022/0139891 A1* | 5/2022 | Kim | H01L 33/22 257/89 |

* cited by examiner

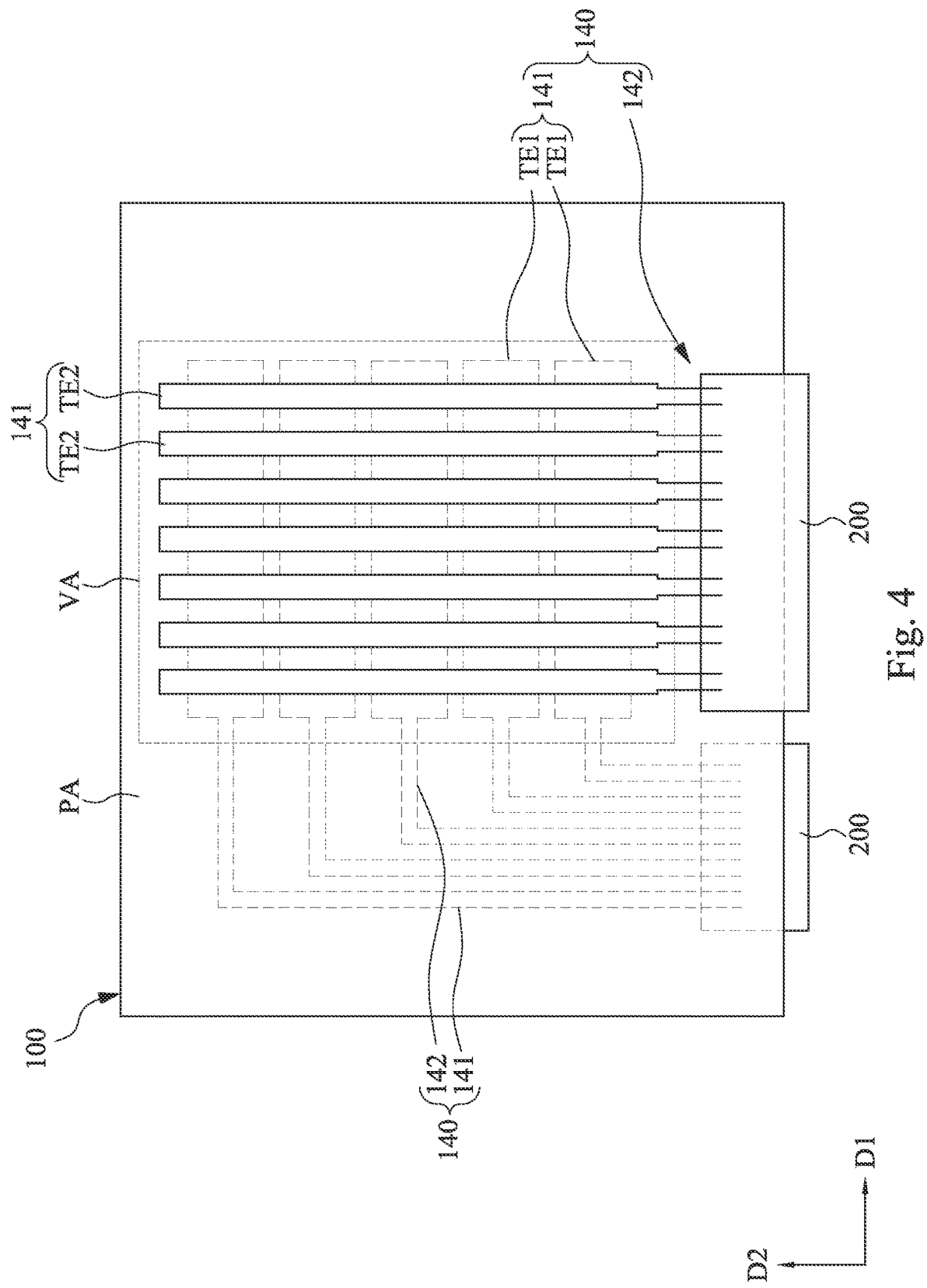

TOUCH PANEL, ELECTRONIC DEVICE AND MANUFACTURE METHOD THEREOF

BACKGROUND

Field of Disclosure

The present disclosure relates to a touch panel and manufacture method thereof.

Description of Related Art

Transparent wires are light permeable and electrically conductive, making them suitable for use in many displays or touch devices. Generally, transparent wires have been made of any of a variety of metal oxides, such as ITO (indium tin oxide), IZO (indium zinc oxide), CTO (cadmium tin oxide), or AZO (aluminum-doped zinc oxide). However, any film layer made of any of these metal oxides cannot satisfy the flexibility requirements of display devices. Therefore, various flexible transparent wires, such as transparent wires made of nanowires or the like, have been developed.

A decorative layer (also referred to as a black layer) is used in current touch panels for separating the peripheral area and the visible area, but the materials of the decorative layer (such as ink) are expensive. In addition, there are conditions such as wire offset during the manufacture of transparent wires. Therefore, how to reduce the cost of the decoration layer and improve the problem of wire offset are important issues.

SUMMARY

One aspect of the present disclosure relates to a touch panel, including a substrate, a conductive wire structure layer, and a light-shielding structure. The substrate includes a visible area and a peripheral area surrounding the visible area. The conductive wire structure layer is disposed on the visible area. The light-shielding structure includes a first material layer and a second material layer, in which an optical density of the light-shielding structure is lower than 4, the first material layer is disposed on the peripheral area, and the second material layer is disposed on the first material layer.

In some embodiments, the second material layer extends and covers the conductive wire structure layer and a region of the visible area where the conductive wire structure layer is not disposed.

In some embodiments, the peripheral trace structure layer is disposed on the peripheral area and electrically connected to the conductive wire structure layer.

In some embodiments, a portion of the first material layer is disposed on two sides of the peripheral trace structure layer and contacts the peripheral trace structure layer.

In some embodiments, the second material layer is disposed on the peripheral trace structure layer.

In some embodiments, a material of the substrate includes polyvinyl chloride, polyethylene terephthalate, polyethylene naphthalate, polycarbonate, polystyrene, polyimide, cycloolef in polymer, or a combination thereof.

In some embodiments, a catalytic layer is further included and disposed between the conductive wire structure layer and the substrate, between the peripheral trace structure layer and the substrate, or a combination thereof.

In some embodiments, a material of the catalytic layer includes metal nanoparticles.

In some embodiments, the conductive wire structure layer and the peripheral trace structure layer include metal wires.

In some embodiments, an optical refractive index of the first material layer is different from an optical refractive index of the second material layer.

In some embodiments, a dielectric constant of the second material layer is less than 3 F/m.

In some embodiments, a water absorbency of the second material layer is not higher than 0.2%, or a water permeability of the second material layer is lower than 1500 $g/m^2$-day.

In some embodiments, a cover is further included and disposed on the second material layer.

In some embodiments, the cover includes a glass cover, a polarizer, or a combination thereof.

One aspect of the present disclosure relates to a method of manufacturing a touch panel, including: providing a substrate including a visible area and a peripheral area; forming a first material layer on the visible area and on the peripheral area, in which the first material layer on the visible area is separated into a plurality of first portions by a plurality of first recesses; forming a conductive wire structure layer in the plurality of first recesses; removing the first material layer on the visible area; and disposing a second material layer on the conductive wire structure layer, the visible area where the conductive wire structure layer is not disposed, and the first material layer on the peripheral area, in which an optical density of an overlapping region of the first material layer and the second material layer is lower than 4.

In some embodiments, the plurality of first recesses expose a surface of the substrate.

In some embodiments, removing the first material layer on the visible area includes exposing a surface of the substrate.

In some embodiments, forming the first material layer on the visible area and on the peripheral area includes separating the first material layer on the peripheral area into a plurality of second portions by a plurality of second recesses; and forming the conductive wire structure layer in the plurality of first recesses includes simultaneously forming a peripheral trace structure layer in the plurality of second recesses and electrically connecting the peripheral trace structure layer to the conductive wire structure layer.

In some embodiments, disposing the second material layer on the conductive wire structure layer, the visible area where the conductive wire structure layer is not disposed, and the first material layer on the peripheral area includes disposing the second material layer on the peripheral trace structure layer.

In some embodiments, a cover disposed on the second material layer is further included.

In some embodiments, the method further includes: disposing the cover on the second material layer includes: providing an insulating glue; and adhering the cover to the second material layer by the insulating glue.

In some embodiments, the method further includes: after providing the substrate, forming a catalytic layer on the visible area and on the peripheral area, in which the catalytic layer includes metal nanoparticles, forming the first material layer includes forming the first material layer on the catalytic layer on the visible area, in which the first material layer is separated into the plurality of first portions by the plurality of first recesses, and the plurality of first recesses expose the catalytic layer, and forming the conductive wire structure layer includes performing a reduction reaction on the catalytic layer to form the conductive wire structure layer in the plurality of first recesses are further included.

In some embodiments, forming the first material layer on the catalytic layer on the visible area includes simultaneously forming the first material layer on the catalytic layer on the peripheral area, in which the first material layer located on the peripheral area is separated into the plurality of second portions by the plurality of second recesses, and the plurality of second recesses expose the catalytic layer; and performing the reduction reaction on the catalytic layer to form the conductive wire structure layer in the plurality of first recesses includes simultaneously forming the peripheral trace structure layer in the plurality of second recesses and connecting the peripheral trace structure layer to the conductive wire structure layer.

In some embodiments, disposing the second material layer on the conductive wire structure layer, the visible area where the conductive wire structure layer is not disposed, and the first material layer on the peripheral area includes disposing the second material layer on the peripheral trace structure layer.

One aspect of the present disclosure relates to an electronic device, including mobile devices, wearable devices, or car devices.

In some embodiments, mobile devices include mobile phones, tablets, laptops, or a combination thereof.

In some embodiments, wearable devices include smart watches, smart glasses, smart clothes, smart shoes, or a combination thereof.

In some embodiments, car devices include dashboards, driving recorders, car rearview mirrors, car windows, car doors, or a combination thereof.

BRIEF DESCRIPTION OF THE DRAWINGS

The various aspects of the content of the present disclosure can be best understood from the following detailed description, read together with the accompanying drawings.

FIG. 4 illustrates a top view of an example touch panel and an example flexible circuit board after assembly in accordance with some embodiments of the present disclosure.

DETAILED DESCRIPTION

Figure 1A:
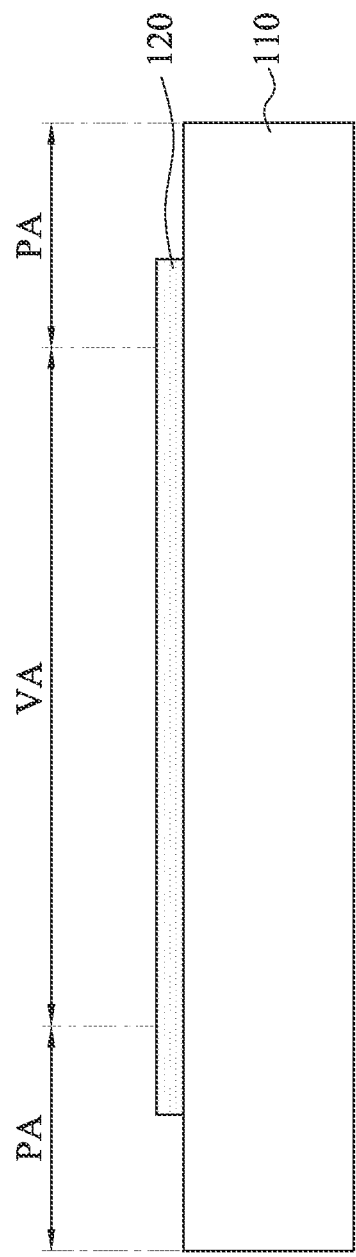
FIG. 1A to FIG. 1G describe example processes of manufacturing a touch panel in accordance with some embodiments of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this present disclosure generally have their ordinary meanings in the field and the context in which they are used. The examples used in the present disclosure, including examples of any terms discussed herein, are only illustrative and do not limit the scope and meaning of the present disclosure or any exemplary terms. Likewise, the present disclosure is not limited to some embodiments provided in the present disclosure.

In addition, spatial relative terms, such as "under", "upper", and the like, are used to conveniently describe the relative relationship between one element or one feature and other elements or features in the figures. Spatial relative terms are intended to include different orientations of the device other than the orientation in which the device is used or operated. The device can be positioned separately (for example, rotated by 90 degrees or other orientations), and the spatial relative description used in the article can also be explained accordingly.

As used herein, the singular forms "a", "an" and "the" are intended to include singular form or the plural forms as well, unless the context clearly indicates otherwise. It will be further understood that the terms "comprises" and/or "comprising", "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that despite the terms "first", "second", etc. possibly being used herein to describe various elements, these elements should not be limited by these terms. These terms are used to distinguish one element from another. For example, the first element may be referred to as the second element, and similarly, the second element may be referred to as the first element without departing from the scope of the embodiment.

As used herein, the term "and/or" includes any and all combinations of one or a variety of associated listed items.

A number of examples are provided herein to elaborate upon the touch device of the instant disclosure. However, the examples are for demonstration purpose alone, and the instant disclosure is not limited thereto.

FIG. 1A to FIG. 1G describe example processes of manufacturing a touch panel in accordance with some embodiments of the present disclosure.

First of all, please refer to FIG. 1A. A substrate 110 is provided, and a visible area VA and a peripheral area PA are defined in the substrate 110. Next, a catalytic layer 120 is formed on the visible area VA and a portion of peripheral area PA.

In some embodiments, the substrate 110 may be a flexible transparent substrate, and the material may be selected from polyvinyl chloride (PVC), polypropylene (PP), polyethylene terephthalate (PET), polyethylene naphthalate (PEN), polycarbonate (PC), polystyrene (PS), polyimide (PI), cyclo-olefin polymers (COP), or other transparent materials, for achieving the bendable and flexible efficiency.

Figure 1B:
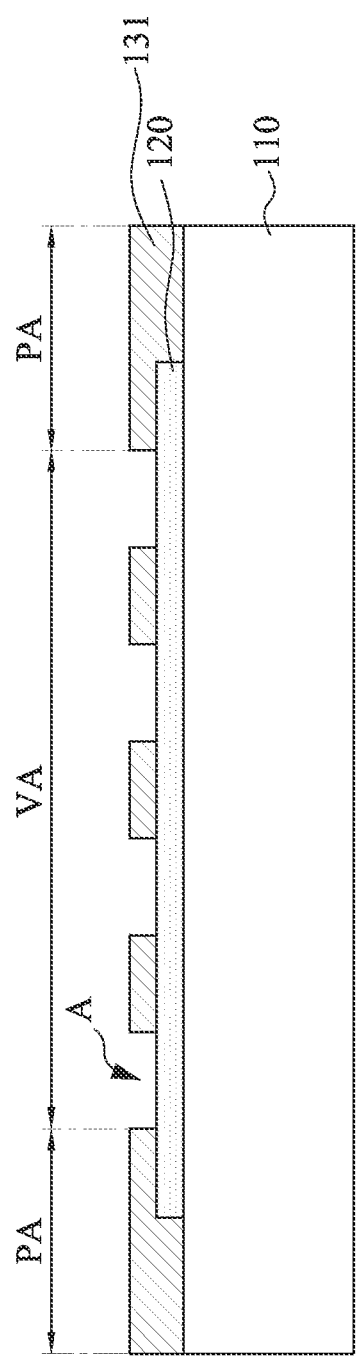
Figure 1C:
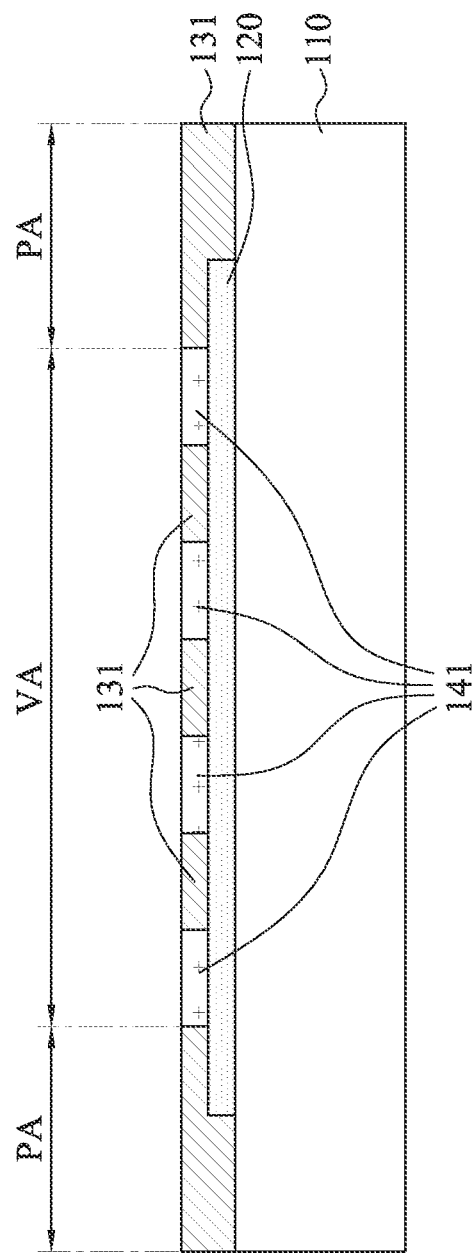
Figure 1D:
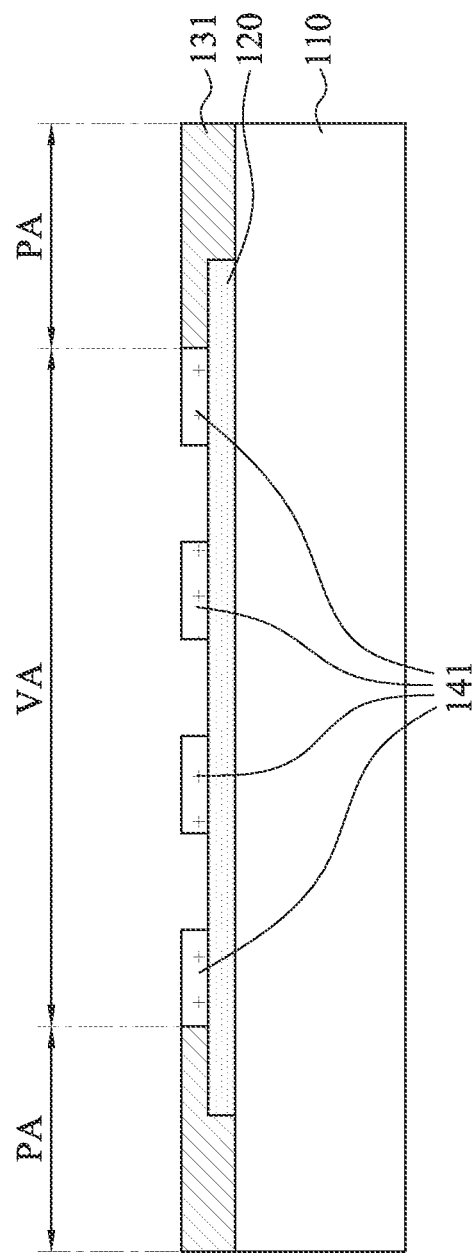

The catalytic layer 120 is used to catalyze the deposition of a conductive wire structure layer 141 (refer to FIG. 1D). The catalytic layer 120 can be an insulation layer including catalytic particles. For example, the catalytic layer 120 can be made of acrylic resin or epoxy resin, in which conductive nanoparticles or catalytic nanoparticles are included and distributed in the resin, thereby making the catalytic layer 120 insulation. In one embodiment, the nanoparticles can be Ag nanoparticles, Pa nanoparticles, Cu nanoparticles, Ag/Pa nanoparticles, Cu/Pa nanoparticles, or the like, but the nanoparticles are not limited thereto. In some embodiments, the thickness of the catalytic layer 120 is less than about 1 μm, such as 10 nm to 1 μm, specifically including 10 nm, 50 nm, 100 nm, 200 nm, 300 nm, 400 nm, 500 nm, 600 nm, 700 nm, 800 nm, 900 nm, 1 μm, or any value within the abovementioned intervals. In one embodiment, the catalytic layer 120 can be formed by printing on a region of the substrate 110 intended to form the conductive wire structure layer 141, but the method of forming the catalytic layer 120 is not limited thereto.

In some embodiments, the peripheral area PA surrounds the visible area VA, (e.g., the peripheral area PA is disposed on a frame-shaped region around (i.e., including right side, left side, upper side, and lower side) the visible area VA). In other embodiments, the peripheral area PA is disposed at the left side and the lower side of an L-shaped region on the visible area VA.

Next, refer to FIG. 1B. A first material layer 131 is formed on the catalytic layer 120, in which the first material layer 131 is located on the visible area VA and the peripheral area PA, and the first material layer 131 is separated into a plurality of first portions on the visible area VA by first recesses A, exposing the catalytic layer 120. It is worth noting that, at this step, the first recesses A, constituted by the blank regions of the catalytic layer 120 where the first material layer 131 is not disposed, pre-locate the position(s) of the wire structure to be formed, therefore avoiding wire offset and skew. The position(s) of the first recesses A can be flexibly adjusted according to disposition requirements. In some embodiments, the position(s) of the first recesses A can be reserved at the step of forming the first material layer 131, or the first recesses A can be formed by forming a first material layer 131 which is planar without recesses and then removing a portion of first material layer 131. In some embodiments, at the step of forming the first material layer 131 on the visible area VA and the peripheral area PA, the first material layer 131 on the peripheral area PA may also be separated into a plurality of second portions by second recesses (not shown). In some embodiments, the first material layer 131 is an insulating material. In some embodiments, the first material layer 131 may be transparent, such as a peelable mask.

Furthermore, please refer to FIG. 10. A conductive wire structure layer 141 is formed in the first recesses A (FIG. 1B) on the visible area VA. That is, a portion of first material layer 131 is positioned on two sides of the conductive wire structure layer 141 on the visible area VA and contacts the conductive wire structure layer 141. In some embodiments, a peripheral trace structure layer 142 (refer to FIG. 3) is formed on the second recesses (not shown) and electrically connected to the conductive wire structure layer 141 on the visible area VA while forming the conductive wire structure layer 141. As such, the portion of first material layer 131 is located on two sides of the peripheral trace structure layer 142 on the peripheral area PA and contacts the peripheral trace structure layer 142. Therefore, the portion of the catalytic layer 120 on the visible area VA is located between the conductive wire structure layer 141 and the substrate 110, and the portion of the catalytic layer 120 on the peripheral area PA is located between the peripheral trace structure layer 142 and the substrate 110.

In some embodiments, the conductive wire structure layer 141 and the peripheral trace structure layer 142 constituted by metal wires (i.e., wires with metal materials) can be formed by electroless plating. Specifically, a plating solution is applied to the catalytic layer 120 with a suitable reducing agent without external current to make metal ions in the plating solution reduce to metal under catalysis of a metal catalyst and be plated on the surface of the catalytic layer 120. This process is called electroless plating or autocatalytic plating. For example, when the conductive wire structure layer 141 and the peripheral trace structure layer 142 are to include copper, the plating solution used to form the conductive wire structure layer 141 and the peripheral trace structure layer 142 may include copper sulfate. A composition of the copper sulfate may be, but is not limited to, copper sulfate with a concentration of 5 g/L, ethylenediaminetetraacetic acid with a concentration of 12 g/L, and formaldehyde with a concentration of 5 g/L. The pH of the electroless copper plating solution (i.e., the plating solution including copper sulfate) is adjusted to about 11 to 13 with sodium hydroxide. The temperature of the plating bath may be about 30° C. to 50° C., and the immersion reaction time may be 5 to 15 minutes. During the reaction process, copper in the plating solution can be nucleated on the catalytic layer 120 having catalytic/activation ability and then self-catalyzed by copper to continuously grow as the copper film. Those skilled in the art can choose the appropriate plating solution and materials of the catalytic layer 120 according to the materials of the conductive wire structure layer 141 and the peripheral trace structure layer 142 intended to be obtained. In some embodiments, the conductive wire structure layer 141 and the peripheral trace structure layer 142 can include or be composed of a metal material with good conductivity, such as a silver layer, a copper layer, etc. or a multilayer metal structure, such as a molybdenum/aluminum/molybdenum layer, copper/nickel layer, titanium/aluminum/titanium layer, molybdenum/chromium layer, etc.

In another embodiment, for increasing the thickness of the conductive wire structure layer 141 and the thickness of the peripheral trace structure layer 142, a thickening step may be added, such as an electroplating process, and the composition of the electroplating solution may include, but is not limited to, copper sulfate with a concentration of 200 g/L, sulfuric acid with a concentration of 80 g/L, and chloride ion with a concentration of 50 mg/L. The pH is adjusted to about 3 to 5. The current density is about 1-10 Å/dm$^2$. The plating bath temperature is about 25° C. to 45° C. The order of the electroless plating process and the electroplating process described above can be adjusted according to actual requirements of the manufacturing process and is not limited herein. For example, the electroplating process can be performed first, followed by the electroless plating process, or the electroless plating process can be performed prior to the electroplating process.

It is possible to perform either the electroplating process or the electroless plating process alone. In other embodiments, the thickening step may be another electroless electroplating process, such as an electroless copper electroplating process using another plating solution with a composition different from the above-mentioned plating solution in order to increase the thickness of the conductive wire structure layer 141 and the peripheral trace structure layer 142.

Next, refer to FIG. 1D. The first material layer 131 on the visible area VA is removed. That is, on the visible area VA, the catalytic layer 120 is exposed in the gaps between the wires of the conductive wire structure layer 141. This step is to avoid a light-shielding effect caused by overlapping of the first material layer 131 and a second material layer 132 (refer to FIG. 1E), which worsens the visibility of the visible area VA when the second material layer 132 covers the first material layer 131 on the visible area VA if the first material layer 131 remains on the visible area VA.

Figure 1E:
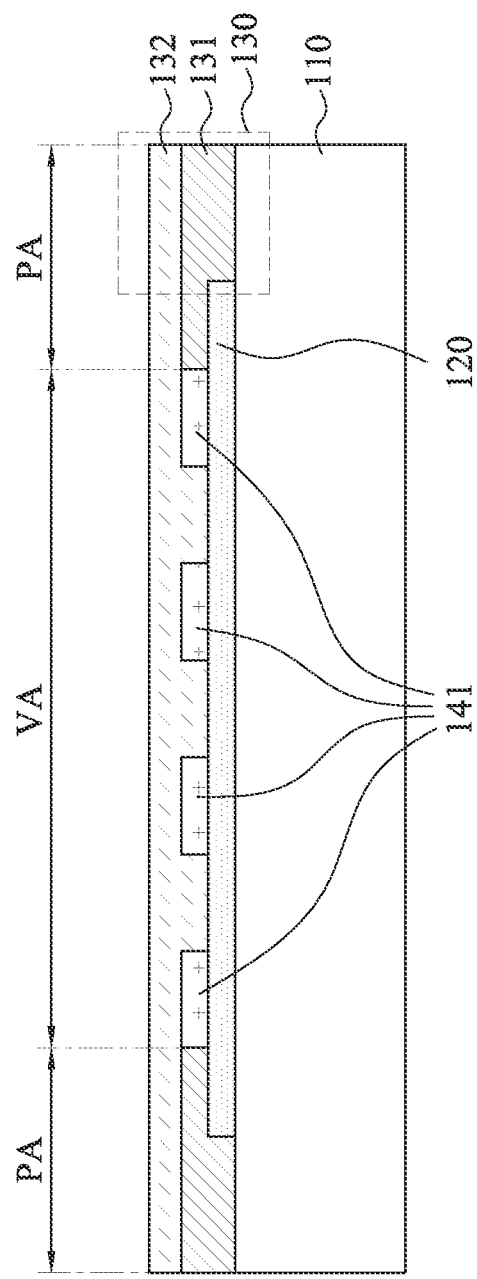

Please refer to FIG. 1E, the second material layer 132 is disposed on the conductive wire structure layer 141, the visible area VA where the conductive wire structure layer 141 is not disposed (that is, covering each layer of the structure on the visible area VA), and the first material layer 131 on the peripheral area PA. In some embodiments, the second material layer 132 further extends and covers the peripheral trace structure layer 142 on the peripheral area PA.

It should be emphasized that when the first material layer 131 and the second material layer 132 overlap, the optical density is lower than 4, such as 1, 2, 3, 4, or any value within the abovementioned intervals. The optical density is calculated by OD=log (incident light/transmitted light) or OD=log (1/transmittance), which is the logarithm of the ratio of incident light to transmitted light. That is, the lower the optical density, the higher the ratio of absorbed light. The light-shielding structure 130 formed by overlapping the first material layer 131 and the second material layer 132 has a total optical density of lower than 4 and can serve as a decorative layer for the visible area VA and the peripheral area PA. In some embodiments, the second material layer 132 is transparent to avoid interference with the visual effect of the region of the visible area VA while covering the visible area VA and the conductive wire structure layer 141. In some embodiments, the optical refractive index of the first material layer 131 is different from which of the second material layer 132. Therefore, the overlapping of the first material layer 131 and the second material layer 132 can block light transmission, thereby achieving the light-shielding effect with the optical density of lower than 4. In some embodiments, the light-shielding structure 130 can be formed for serving as the decoration layer between the visible area VA and the peripheral area PA even if both of the first material layer 131 and the second material layer 132 are transparent.

In addition, it is also worth mentioning that materials with lower costs can be selected instead of the conventional expensive ink used for the decoration layer, thereby reducing the production cost, by means of the principle that the optical refractive index of the first material layer 131 is different from the second material layer 132 in some embodiments of the present disclosure.

In some embodiments, the dielectric constant of the second material layer 132 is less than 3 farads/meter (F/m), which can be 0-2.9 F/m (such as 0 F/m, 0.5 F/m, 1 F/m, 1.5 F/m, 2 F/m, 2.5 F/m, 2.6 F/m, 2.7 F/m, 2.8 F/m, 2.9 F/m, or any value within the abovementioned intervals). In some embodiments, the water absorbency of the second material layer 132 is not higher than 0.2%, which can be 0%, 0.1%, 0.2%, or any value with the abovementioned intervals. In some embodiments, the water permeability of the second material layer 132 is lower than 1500 g/m$^2$-day, which can be 0 to 1499 (for example, 0, 100, 200, 300, 400, 500, 600, 700, 800, 900, 1000, 1100, 1200, 1300, 1400, 1499, or any value with the abovementioned intervals). It is noted that the second material layer 132 serves as a protection layer for reducing contact of the wires to moisture, thereby reducing electrostatic discharge (ESD) and electron migration, which are problems of the conductive wire structure layer 141 or the peripheral trace structure layer 142 caused by excessive moisture, when the second material layer 132 is disposed on the conductive wire structure layer 141 or the peripheral trace structure layer 142.

In some embodiments, the second material layer 132 may be a transparent photoresist or a transparent ink. Table 1 represents the parameters of the second material layer 132 in two examples (transparent ink).

TABLE 1

Characteristic parameter table of the second material layer

| | Example 1 | Example 2 |
|---|---|---|
| Thickness (μm) | 150 | 200 |
| Water absorbency (%) | 0.1 | 0.2 |
| Dielectric constant (F/m) | 2.56 | 2.85 |
| Water permeability (g/m$^2$-day) | 50 | 1350 |

Figure 1F:
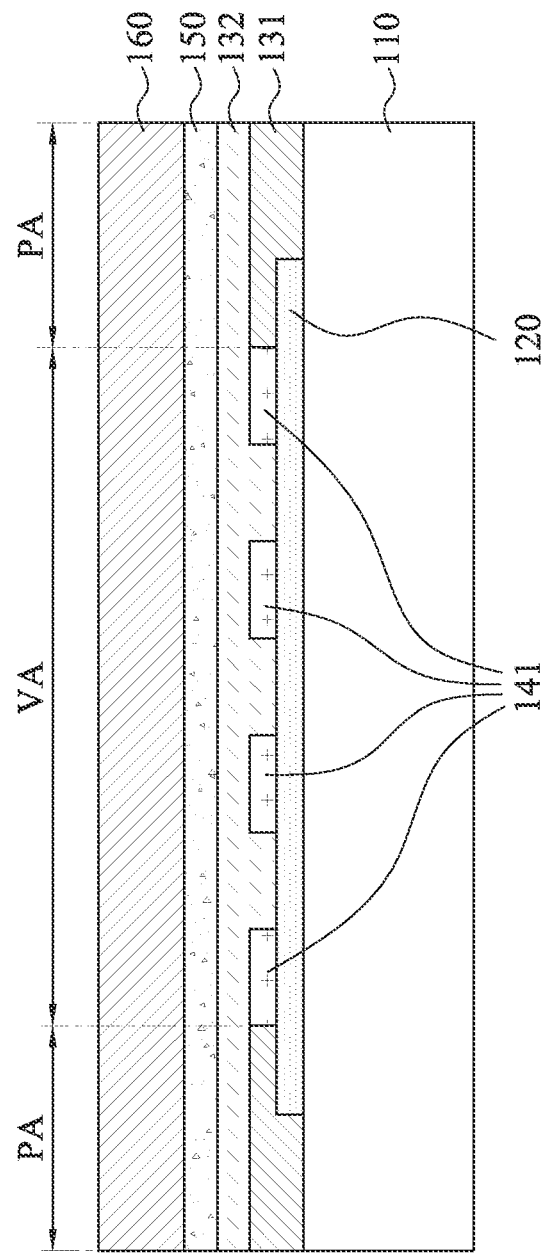

Next, please refer to FIG. 1F. A cover 160 is adhered to the second material layer 132 and covers the visible area VA and the peripheral area PA by an insulating glue 150, and a touch panel 100 is formed. In some embodiments, the insulating glue 150 may be optical glue, but the material(s) of the insulating glue 150 is not limited thereto. In some embodiments, the cover 160 may be a glass cover, a polarizer, or a combination thereof. In some embodiments, a light-shielding material may be coated on a portion of the cover 160 corresponding to the peripheral area PA for covering the peripheral area PA.

Figure 1G:
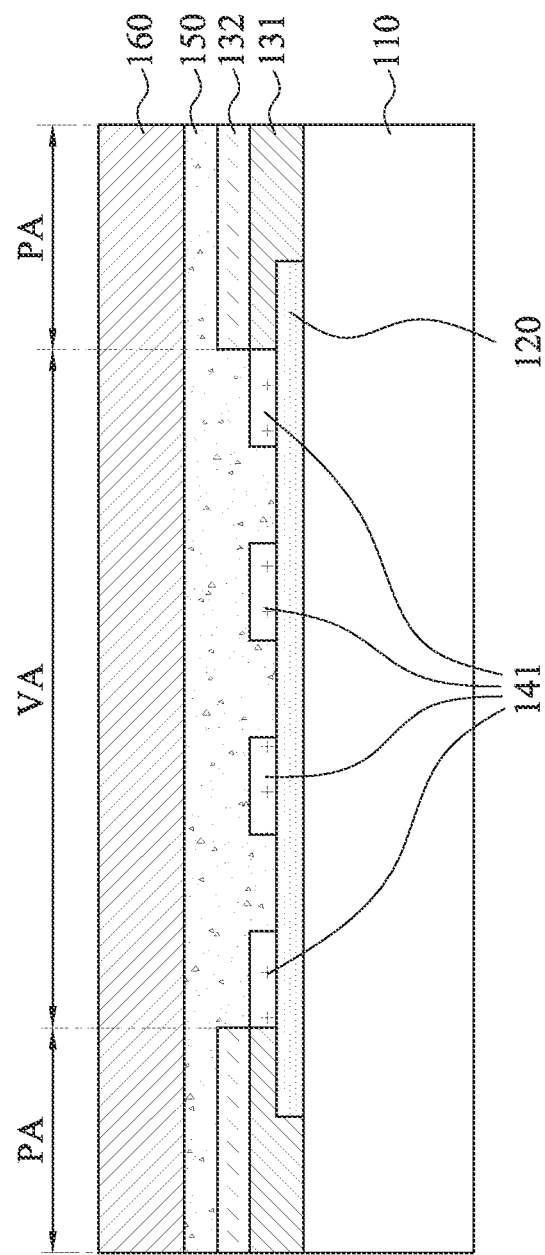

In other simplified embodiments of the present disclosure, please refer to the touch panel 100 in FIG. 1G. The second material layer 132 can only cover the first material layer 131 on the peripheral area PA neighboring the visible area VA to form the light-shielding structure 130 as the decorative layer instead of extending and covering the conductive wire structure layer 141 on the visible area VA and the peripheral trace structure layer 142 on the peripheral area PA (with respect to the peripheral trace structure layer 142, please also refer to FIG. 3).

Furthermore, please refer to FIG. 2A to FIG. 2E. Other embodiments of the present disclosure are provided in FIG. 2A to FIG. 2E. The conductive wire structure layer 141 and the peripheral trace structure layer 142 in FIG. 2A to FIG. 2E can be formed without the catalysis of the catalytic layer 120, and the manufacture process can be simplified, compared with the method of forming the conductive wire structure layer 141 and the peripheral trace structure layer 142 by the catalysis of the catalytic layer 120.

Figure 2A:
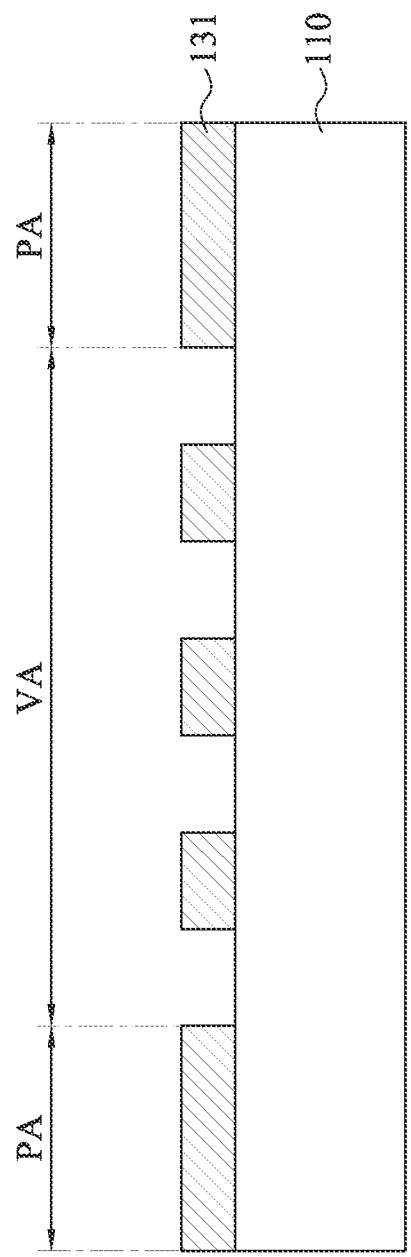
FIG. 2A to FIG. 2E describe example processes of manufacturing a touch panel in accordance with other embodiments of the present disclosure.

Specifically, please refer to FIG. 2A. The first material layer 131 is formed on the substrate 110. The major steps are similar to those in FIG. 1B. The difference between the steps of FIG. 2A and FIG. 1B is that in FIG. 2A, the first material layer 131 is disposed on the substrate 110, and no catalytic layer 120 is required between the first material layer 131 and the substrate 110.

Figure 2B:
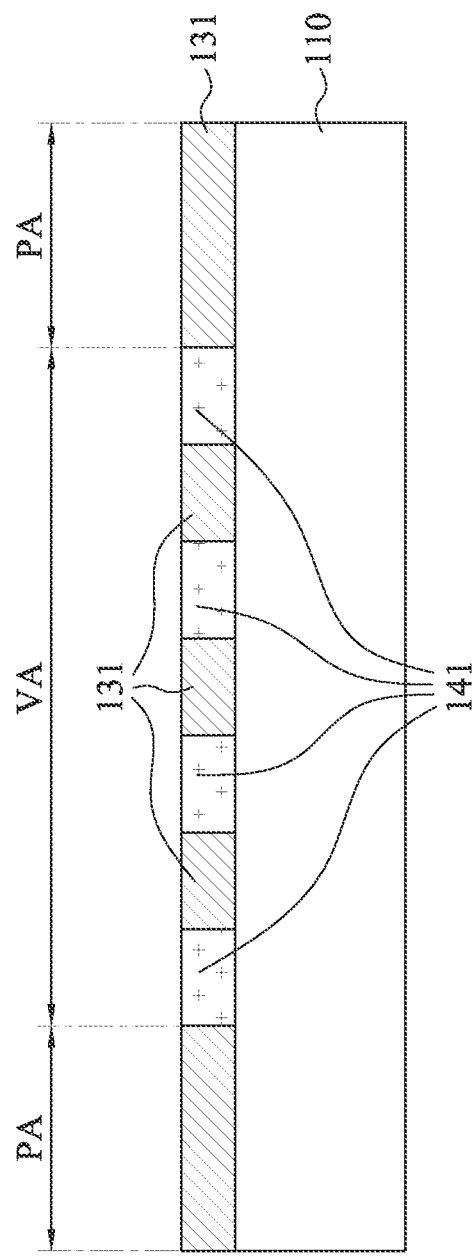

Next, please refer to FIG. 2B. The conductive wire structure layer 141 is formed in the first recesses A. In some embodiments, the peripheral trace structure layer 142 (refer to FIG. 3) can be formed in the second recesses (not shown) and electrically connected to the conductive wire structure layer 141 on the visible area VA. In some embodiments, a metal nanowires layer including metal nanowires may be used as the conductive wire structure layer 141 and the peripheral trace structure layer 142. In some embodiments, the metal nanowires layer may include, for example, a silver nanowires layer, a gold nanowires layer, or a copper nanowires layer. The specific method of forming a metal nanowires layer is described as follows, including: a dispersion or ink including the metal nanowires is formed on the blank regions of the substrate 110 where the first material layer 131 is not disposed (that is, the first recesses A or the second recesses described above (not shown) or both, which can be adjusted according to the requirements for wire design) by coating, and then the metal nanowires are dried to form the metal nanowires layer disposed on and covering the surfaces of the substrate 110. After the curing/drying step described above, the solvent or the like of the ink is evaporated, and the metal nanowires are distributed in a random manner and fixed to the surfaces of the substrate 110, thereby forming the metal nanowires layer. The metal nanowires can be in contact with each other to provide a continuous current path, thereby forming a conductive network. In some embodiments, the dispersion may be water, alcohol, ketone, ether, hydrocarbon, or aromatic solvent (benzene, toluene, xylene, etc.). In one embodiment, the dispersion may also include an additive, a surfactant, or an adhesive, such as carboxymethyl cellulose (CMC), 2-hydroxyethyl cellulose (2-HEC), hydroxypropyl methylcellulose (HPMC), sulfonate, sulfate, disulfonate, sulfosuccinate, phosphate, fluorine-containing surfactant, etc., but the composition of the dispersion is not limited thereto. It can be understood that the dispersion or ink including the metal nanowires may be formed on the surface of the substrate 110 in any manner, such as, but not limited to, screen printing, spray coating, roller coating, etc. In one embodiment, a roll-to-roll (RTR) process may be used to coat the dispersion or ink including the metal nanowires to the surfaces of the substrate 110 continuously supplied.

As used herein, "metal nanowires" is a collective term that refers to a collection of metal wires including multiple element metals, metal alloys, or metal compounds (including metal oxides), in which the number of metal nanowires included therein does not affect the scope of protection claimed by the present invention. At least one cross-sectional dimension (i.e., the diameter of the cross-section) of a single metal nanowire is less than about 500 nm, preferably less than about 100 nm, or even more preferably less than about 50 nm. In some embodiments, the metal nanostructures referred to as "wires" have a high aspect ratio, for example, between about 10 and 100,000. In detail, the aspect ratio (length:diameter of the cross-section) may be greater than about 10, such as greater than about 50, or even more preferably greater than about 100, but the aspect ratio is not limited thereto. In some embodiments, the metal nanowires may be any metal including, but not limited to, silver, gold, copper, nickel, and gold-plated silver. Other terms, such as silk, fiber, or tube, also having the above-mentioned dimensions and high aspect ratio, are also within the scope of the present disclosure.

Figure 2C:
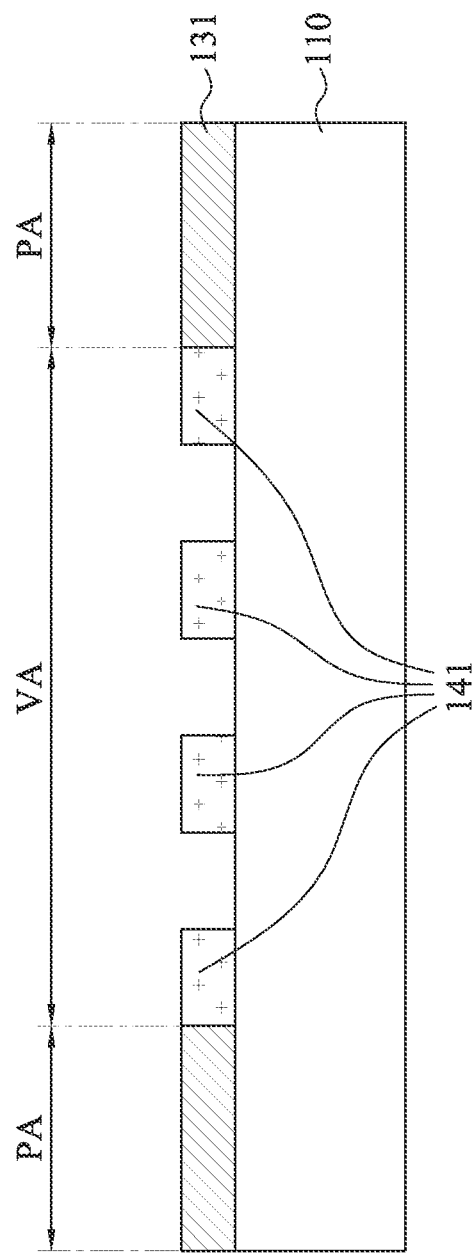
Figure 2D:
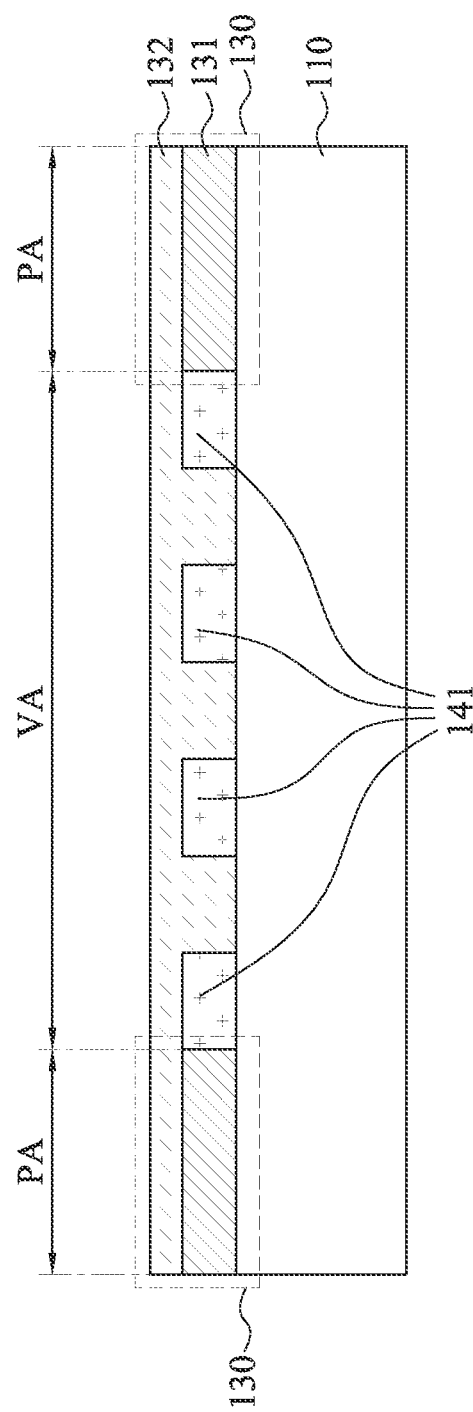

The process illustrated in FIG. 2C to FIG. 2D is similar to that of FIG. 1D and FIG. 1E and will not be repeated herein.

Figure 2E:
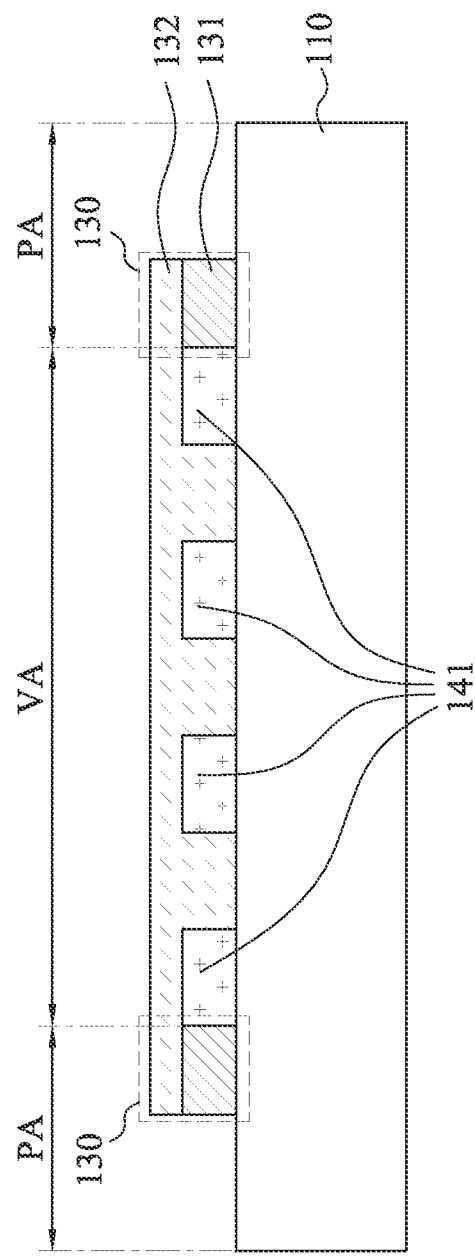

FIG. 2E describes embodiments of an example process of forming the conductive wire structure layer 141 on the visible area VA, in which the first material layer 131 is disposed on the peripheral area PA, the second material layer 132 is disposed on the first material layer 131 to form the light-shielding structure 130, and the second material layer 132 covers the conductive wire structure layer 141 and the visible area VA.

Then, a touch panel can be formed by adhering the cover 160 to the second material layer 132 according to steps similar to those illustrated in FIG. 1F or FIG. 1G.

Figure 3:
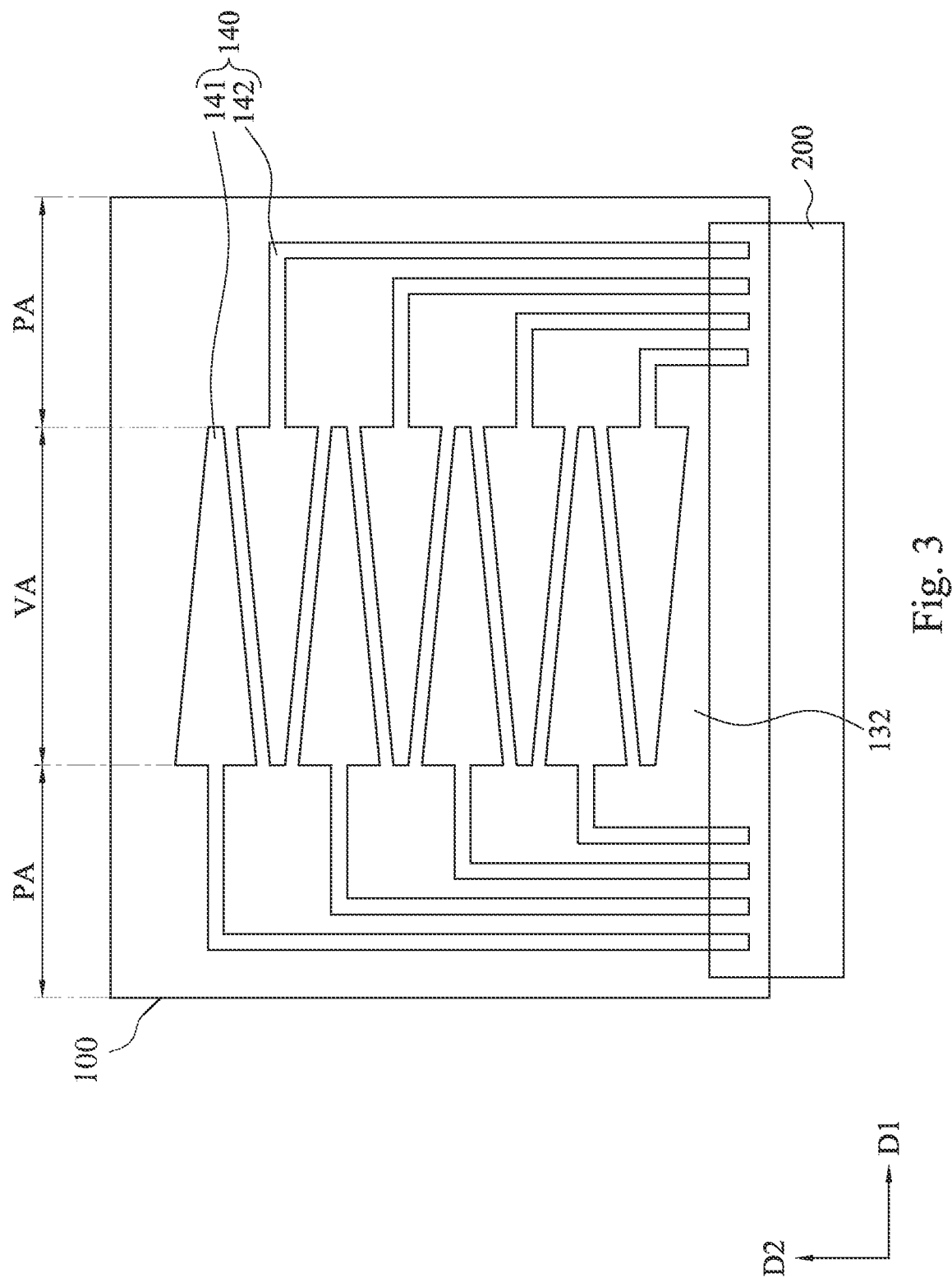
FIG. 3 illustrates a top view of an example touch panel and an example flexible circuit board after assembly in accordance with some embodiments of the present disclosure.

Next, please refer to FIG. 3. FIG. 3 is an assembled structure of a flexible circuit board 200 and a touch panel 100, in which an electrode structure 140 is formed by the conductive wire structure layer 141 and the peripheral trace structure layer 142 together. In addition, electrode pads (not shown) of the flexible circuit board 200 can be electrically connected to the peripheral trace structure layer 142 on the peripheral area PA of the substrate 110 through a conductive paste (not shown) (e.g., anisotropic conductive adhesive/paste). In some embodiments, touch electrodes formed by the conductive wire structure layer 141 are non-cross arranged. For example, the conductive wire structure layer 141 on the visible area VA defines conducting bars extending along a first direction D1, which are not intersected with each other. In other embodiments, the conductive wire structure layer 141 can have other shapes, and the shape of the conductive wire structure layer 141 is not limited to those described in the present disclosure. In one embodiment, the electrode structure 140 is disposed to from a single-layer structure, so that a touch position can be determined by detecting variations of capacitances of the touch electrodes formed by the conductive wire structure layer 141.

Please continue to refer to FIG. 3. The second material layer 132 on the visible area VA surrounds the conductive wire structure layer 141 and covers the conductive wire structure layer 141 (please refer to FIG. 1E and FIG. 2D). On the peripheral area PA, the light-shielding structure 130 is formed by covering the second material layer 132 on the first material layer 131 on the peripheral area PA neighboring to the visible area VA (refer to the structure of FIG. 1E and FIG. 2D, in which the second material layer 132 covers the first material layer 131) as the decorative layer. In some embodiments, the second material layer 132 covers the conductive wire structure layer 141 and the peripheral trace structure layer 142 (refer to FIG. 1E and FIG. 2D). In other embodiments, the conductive wire structure layer 141, the peripheral trace structure layer 142, or both can directly cover the insulating glue 150 (refer to FIG. 1G).

Please refer to FIG. 4. The embodiment of FIG. 4 is similar to that of the embodiment of FIG. 3. The difference between these two figures is that the electrode structure 140 formed by the conductive wire structure layer 141 and the peripheral trace structure layer 142 in FIG. 4 is disposed to from a double layer configuration.

The configuration of the first touch sensing electrodes TE1 and the second touch sensing electrodes TE2 formed by the conductive wire structure layer 141 is used for discussing the embodiment of FIG. 4. Please continue to refer to FIG. 4. The first touch sensing electrodes TE1 are formed on one surface (e.g., the bottom surface) of the substrate 110, and the second touch sensing electrodes TE2 are formed on another surface (e.g., the top surface) of the substrate 110. Thus, the first touch sensing electrodes TE1 and the second touch sensing electrodes TE2 are electrically isolated from each other. The peripheral trace structure layer 142 connected to the first touch sensing electrodes TE1 is formed on the bottom surface of the substrate 110 corresponding to the first touch electrode TE1. Similarly, the peripheral trace structure layer 142 connected to the second touch sensing electrodes TE2 is formed on the top surface of the substrate 110 corresponding to the second touch sensing electrodes TE2. The first touch sensing electrodes TE1 are bar-shape electrodes extending along a first direction D1, and the second touch sensing electrodes TE2 are bar-shape electrodes extending along a second direction D2. The extension direction (corresponding to the longest dimension) of the first touch sensing electrodes TE1 is different from that of the second touch sensing electrodes TE2, and the first touch sensing electrodes TE1 and the second touch sensing electrodes TE2 intersect with each other. In other embodiments, the shapes of the first touch sensing electrodes TE1 and the second touch sensing electrodes TE2 can be flexibly adjusted according to the requirements, and the shapes of the first touch sensing electrodes TE1 and the second touch sensing electrodes TE2 are not limited to those described in the present disclosure.

The first touch sensing electrodes TE1 and the second touch sensing electrodes TE2 are configured for transmitting control signals and receiving touch sensing signals, respectively. Accordingly, the touch position can be obtained by detecting signal variations between the first touch sensing electrodes TE1 and the second touch sensing electrodes TE2 (such as variations of the capacitances). According to this method, users can perform touch sensing at various points on the substrate 110.

In some embodiments, a membrane layer can be included in the touch panel 100 and entirely covers the touch panel 100. That is, the membrane layer is disposed on both of the top surface and the bottom surface of the substrate 110, covering the top surface and the bottom surface of the substrate 110.

The touch panel 100 of the present disclosure may be assembled with other electronic elements to form an electronic device. For example, a display with a touch function can be manufactured by attaching the substrate 110 to a display element (such as a liquid crystal display element or an organic light-emitting diode (OLED) display element) by the insulating glue 150. In some embodiments, the touch panel 100 of some embodiments in the present disclosure can also be applied in electronic devices, including, but not limited to, mobile devices (mobile phones, tablets, laptops, but the types of mobile devices are not limited thereto), wearable devices (smart watches, smart glasses, smart clothes, and smart shoes, but the types of wearable device are not limited thereto), car devices (such as dashboards, driving recorders, car rearview mirrors, car windows, car doors, or a combination thereof, but the types of car devices are not limited thereto).

A touch panel including a novel light-shielding structure and manufacture method thereof are provided in some embodiments of the present disclosure. The light-shielding structure includes the first material layer and the second material layer, which achieves the light-shielding effects by means of the difference of optical refractive index between the first material layer and the second material layer instead of the conventional light-shielding materials used for the decorative layer between the visible area and the peripheral area which are expensive, so the production cost can be reduced. Besides, by means of the manufacture improvement, the wire position intended to be formed (such as the conductive wire structure layer and the peripheral trace structure layer) can be pre-located during the formation of the first material layer, and the problems of wire offset can be improved.

In addition, it is also worth noting that the characteristics of the second material layer include low dielectric constant, low water absorbency, low water permeability, or the like, so that the second material layer can cover the wires, improving problems such as electrostatic discharge, electron migration, or the like caused by excessive moisture and increasing the safety.

Although the present disclosure has been described in considerable detail with reference to certain embodiments, other embodiments are possible. Therefore, the spirit and scope of the claim of the appended patent application should not be limited to the description of the embodiments contained herein.

What is claimed is:

1. A touch panel, comprising:
    a substrate comprising a visible area and a peripheral area surrounding the visible area,
    a conductive wire structure layer disposed on the visible area; and
    a light-shielding structure comprising a first material layer and a second material layer, wherein:
        an optical density of the light-shielding structure is lower than 4,
        the first material layer is disposed on the peripheral area,
        the second material layer is disposed on the first material layer, and
        the second material layer extends and covers the conductive wire structure layer and a region of the visible area where the conductive wire structure layer is not disposed.

2. The touch panel of claim 1, further comprising:
    a peripheral trace structure layer disposed on the peripheral area and electrically connected to the conductive wire structure layer.

3. The touch panel of claim 2, wherein a portion of the first material layer is disposed on two sides of the peripheral trace structure layer and contacts the peripheral trace structure layer.

4. The touch panel of claim 2, wherein the second material layer is disposed on the peripheral trace structure layer.

5. The touch panel of claim 2, further comprising a catalytic layer disposed between the conductive wire structure layer and the substrate, between the peripheral trace structure layer and the substrate, or a combination thereof.

6. The touch panel of claim 5, wherein a material of the catalytic layer comprises metal nanoparticles.

7. The touch panel of claim 5, wherein the conductive wire structure layer and the peripheral trace structure layer comprise metal wires.

8. The touch panel of claim 1, wherein an optical refractive index of the first material layer is different from an optical refractive index of the second material layer.

9. The touch panel of claim 1, wherein a dielectric constant of the second material layer is less than 3 F/m.

10. The touch panel of claim 1, wherein at least one of:
    a water absorbency of the second material layer is not higher than 0.2%, or
    a water permeability of the second material layer is lower than 1500 g/m$^2$-day.

11. An electronic device comprising the touch panel of claim 1.

12. A method of manufacturing a touch panel, comprising:
    providing a substrate comprising a visible area and a peripheral area;
    forming a first material layer on the visible area and on the peripheral area, wherein the first material layer on the visible area is separated into a plurality of first portions by a plurality of first recesses;
    forming a conductive wire structure layer in the plurality of first recesses;
    removing the first material layer on the visible area; and
    disposing a second material layer on the conductive wire structure layer, the visible area where the conductive wire structure layer is not disposed, and the first material layer on the peripheral area, wherein an optical density of an overlapping region of the first material layer and the second material layer is lower than 4.

13. The method of claim 12, wherein the plurality of first recesses expose a surface of the substrate.

14. The method of claim 12, wherein:
forming the first material layer on the visible area and on the peripheral area comprises separating the first material layer on the peripheral area into a plurality of second portions by a plurality of second recesses, and
forming the conductive wire structure layer in the plurality of first recesses comprises simultaneously forming a peripheral trace structure layer in the plurality of second recesses and electrically connecting the peripheral trace structure layer to the conductive wire structure layer.

15. The method of claim 14, wherein disposing the second material layer on the conductive wire structure layer, the visible area where the conductive wire structure layer is not disposed, and the first material layer on the peripheral area comprises disposing the second material layer on the peripheral trace structure layer.

16. The method of claim 14, after providing the substrate, further comprising:
forming a catalytic layer on the visible area and on the peripheral area, wherein the catalytic layer comprises metal nanoparticles, wherein:
forming the first material layer comprises forming the first material layer on the catalytic layer on the visible area, wherein the first material layer is separated into the plurality of first portions by the plurality of first recesses, and the plurality of first recesses expose the catalytic layer, and
forming the conductive wire structure layer comprises performing a reduction reaction on the catalytic layer to form the conductive wire structure layer in the plurality of first recesses.

17. The method of claim 16, wherein:
forming the first material layer on the catalytic layer on the visible area comprises:
simultaneously forming the first material layer on the catalytic layer on the peripheral area, wherein the first material layer located on the peripheral area is separated into the plurality of second portions by the plurality of second recesses, and the plurality of second recesses expose the catalytic layer, and
performing the reduction reaction on the catalytic layer to form the conductive wire structure layer in the plurality of first recesses comprises:
simultaneously forming the peripheral trace structure layer in the plurality of second recesses and connecting the peripheral trace structure layer to the conductive wire structure layer.

18. The method of claim 17, wherein disposing the second material layer on the conductive wire structure layer, the visible area where the conductive wire structure layer is not disposed, and the first material layer on the peripheral area comprises disposing the second material layer on the peripheral trace structure layer.

19. The method of claim 12, further comprising disposing a cover on the second material layer.

20. The method of claim 12, wherein a dielectric constant of the second material layer is less than 3 F/m.

* * * * *